(12) United States Patent
Rapp et al.

(10) Patent No.: US 7,034,944 B2
(45) Date of Patent: Apr. 25, 2006

(54) DIGITAL FTIR SPECTROMETER

(75) Inventors: Norbert Rapp, Karlsruhe (DE); Arno Simon, Karlsruhe (DE)

(73) Assignee: Bruker Optik GmbH, Ettlingen (DE)

( * ) Notice: Subject to any disclaimer, the term of this patent is extended or adjusted under 35 U.S.C. 154(b) by 0 days.

(21) Appl. No.: 11/179,586

(22) Filed: Jul. 13, 2005

(65) Prior Publication Data

US 2005/0243325 A1  Nov. 3, 2005

Related U.S. Application Data

(63) Continuation of application No. 10/302,919, filed on Nov. 25, 2002, now abandoned.

(30) Foreign Application Priority Data

Dec. 5, 2001 (DE) .................. 101 59 721

(51) Int. Cl.
*G01B 9/02* (2006.01)
(52) U.S. Cl. .................................. 356/451
(58) Field of Classification Search ........ 356/451–456, 356/244; 250/339.07, 339.08
See application file for complete search history.

(56) References Cited

U.S. PATENT DOCUMENTS

| | | | | |
|---|---|---|---|---|
| 3,958,882 A | * | 5/1976 | Gast | ............................ 356/73 |
| 3,977,786 A | * | 8/1976 | Gast | ............................ 356/455 |
| 4,784,488 A | * | 11/1988 | Doyle et al. | ................ 356/455 |
| 4,927,269 A | * | 5/1990 | Keens et al. | ................. 356/451 |
| 5,164,736 A | * | 11/1992 | Jemison et al. | ............. 342/368 |
| 5,251,008 A | * | 10/1993 | Masutani | ..................... 356/451 |
| 5,253,183 A | | 10/1993 | Inoue | |
| 5,406,090 A | | 4/1995 | Mattson | |
| 5,499,095 A | * | 3/1996 | Gast et al. | ................... 356/451 |
| 5,528,363 A | | 6/1996 | Fachinger | |
| 5,790,250 A | | 8/1998 | Wang | |
| 5,841,139 A | * | 11/1998 | Sostek et al. | .......... 250/339.07 |
| 5,963,322 A | | 10/1999 | Rapp | |

FOREIGN PATENT DOCUMENTS

DE  199 40 981  7/2001
JP  052 31 939  9/1993

OTHER PUBLICATIONS

H. Bauer et al., "Handbuch Elektromagnetische Verträglichkeit", VDE Verlag, Berlin, (1987).
"Sensonik", Springer-Verlag, Berlin (1988).
F. Krammer, "Grundlagen der Messtechnik" R. Oldenbourg Verlag, Munich, (1997).
D. G. Farrell, "Microelectronics and Signal Proccessing" Academic Press, New York, (1989).

(Continued)

*Primary Examiner*—Samuel A. Turner
*Assistant Examiner*—Patrick Connolly
(74) *Attorney, Agent, or Firm*—Paul Vincent

(57) ABSTRACT

The present invention relates to an FTIR spectrometer comprising a single-element detector to analyze a detector light beam emitted by a sample, with a unit to digitize the voltage available at the detector output and with a unit to process the digitized voltage. The single-element detector and the dedicated unit to digitize the detector voltage are located immediately adjacent to each other.

19 Claims, 2 Drawing Sheets

OTHER PUBLICATIONS

J. Hoffman "Messen nichtelektrischer Grössen", VDI-Verlag, Düsseldorf (1996).

R.S. Muller; "Microsensors" IEEE Press, New York, (1991).

R. Ohba, "Intelligent Sensor Technology" John Wiley & Sons, New York (1992).

W. Göpel et al. "Sensors", VCH Weinheim (1991).

* cited by examiner

DIGITAL FTIR SPECTROMETER

This application is a continuation of 10/302,919 filed Nov. 25, 2002, now abandoned, and claims Paris Convention priority of DE 101 59 721.5 filed Dec. 5, 2001 the complete disclosures of which are hereby incorporated by reference.

BACKGROUND OF THE INVENTION

The present invention relates to an infrared spectrometer with a housing comprising an optical light source and optical interferometer to divide the input light beam emitted by a light source into two partial beams and to generate a variable optical retardation between the two partial beams as well as to recombine these beams to one output light beam. Furthermore, the infrared spectrometer includes a sample position to accept a sample at which the sample is either irradiated or transmitted by the output light beam, and an optical single-component detector to analyze the detector light beam signal emitted by the sample, a dedicated component to digitize the detector signal available at the detector output, and means to process the digitized detector signal.

Corresponding infrared spectrometers (FTIR spectrometers) are manufactured and distributed by the applicant, e.g. the "IFS 66/S" spectrometer described in applicant's IFS 66/S brochure, dated December 1999.

The prior-art FTIR spectrometers have been used to measure infrared spectra either in transmission or reflection. They have both a compact and a modular design, i.e. the components can be easily replaced, if required, the user can easily switch between different components, e.g. between several sources, detectors or filters. A further outstanding advantage of these spectrometers is that they can be used in connection with external sources or detectors by means of inputs and outputs. They can measure spectra of sunlight, or by means of fiber optics or conventional optics they can be connected to an infrared microscope. The IR light generated within the spectrometer first passes the interferometer, is then directed to an outlet and finally reaches an IR microscope where it illuminates a sample. The light transmitted from or reflected by this sample then reaches an external detector. In case of the microscope, this detector can be an imaging detector array, e.g. FPA array. Its output signals will be digitized, cached and processed by a computer to generate a two-dimensional spatially resolved spectrum. Frequently, several permanently built-in and/or external detectors are used which can be replaced or between which one may switch e.g. by means of a hinged mirror.

According to chapter 4 "New Designs" of the lecture No. 2001 (A. Adam and M. Goodnough) at the Pittsburgh Convention 2000 it is known that analogue-to-digital converters (ADCs) can directly be mounted on an FPA detector chip, thus reducing operating costs and simplifying the system complexity. In the future, this may result in extremely high frame rates of >30 kHz for a 128×128 array. Therefore, this type of detectors is suitable for precise imaging remote-sensing systems incorporating pulsed lasers.

In FTIR spectroscopy an optical signal is frequency-modulated by the interferometer. This frequency-modulated signal is measured by a detector, converted into a corresponding analogue voltage, then digitized and divided into its spectral components by Fourier transformation and displayed.

Instead of single-element detectors, imaging IR spectroscopy usually uses FPA detectors consisting of 64×64 or more elements. These elements undergo a short-time exposure, and subsequently each pixel will be connected by means of an analogue switch to a digitizing unit (ADC) and digitized. This kind of scanning and conversion of a frame with e.g. 64×64 pixels corresponds to one interferogram data point generated by conventional (non-imaging) FTIR spectroscopy. In order to be able to measure data with otherwise identical methods, the electrical bandwidth of the analogue and digital signal needs to be multiplied by the number of pixels.

In contrast to detector arrays which enable digitization of the analogue measuring voltage directly on the detector chip, prior-art single-element detectors transmit the measuring signals emitted by the detector to a remote circuit board which is equipped with an analogue-digital converter (ADC) and, frequently, also with processing digital electronics. Only after the analogue/digital conversion will the further digital processing be performed. The analogue signal path can either be ac connected to fully utilize the dynamic of the analogue/digital converter or dc connected in order to acquire the full information. Ideally, both signals are transferred to the converter to fully benefit from the ADC dynamic and to completely acquire the information. The analogue signal path within the spectrometer may well be in the order of several decimeters.

Infrared spectrometers of the kind mentioned hereinbefore using analogue measuring signal transmission are still unsatisfactory with respect to their susceptibility to external interferences. This invention intends to further reduce this susceptibility.

SUMMARY OF THE INVENTION

The problem is solved in that the single-component detector and the respective digitizing unit to digitize the detector signal are located immediately adjacent to each other. Immediately adjacent means that the single-component detector and an ADC are either integrated on one chip or located on one circuit board or on boards directly adjacent to each other. Thus, the ADC is spatially uniquely assigned to the detector and not to the unit processing the (digitized) measuring signals. The detector with preamplifier and ADC can be housed in a compact, electrically shielded unit. Instead of the analogue signal, the digital signal is now transmitted to the remote digital processing unit.

In this way, the analogue distance between detection and digitization is extremely shortened and as a consequence susceptibility to noise voltages is reduced.

Preferably, all ADCs dedicated to detectors of the infrared spectrometer are immediately adjacent to these detectors. This reduces the susceptibility to interferences for all operating modes.

The current position of the movable mirror within the interferometer, or of the movable mirrors or retroreflectors is usually determined by a laser interferogram. Also the detector measuring signals for the laser light can favorably be digitized by a spatially immediately adjacent ADC or another suitable circuit and transmitted in digital form to the processing unit or spectrometer control which also monitors the mirror feed.

According to the most advanced embodiment all spectrometer measuring signals can be digitized by an ADC which is immediately adjacent to its respective detector and transmitted by the ADC to the processing unit. This is not to be restricted to optical detectors only but can also be extended to other types, e.g. temperature sensors.

Further advantages of the invention ensue from the description and drawing. Furthermore, according to this invention the features mentioned hereinbefore and described hereinafter can be applied on their own or several of them in arbitrary combinations. The embodiments illustrated and described are not to be considered as a complete list, but exemplify the invention.

The drawing illustrates the invention which is explained in detail in accordance with the embodiments. Obviously, the features mentioned hereinbefore and hereinafter as well as described in the Figures need not be applied only in the explicitly described combination, but can also be applied on their own and in arbitrary combinations.

DESCRIPTION OF THE PREFERRED EMBODIMENT

Figure 1:
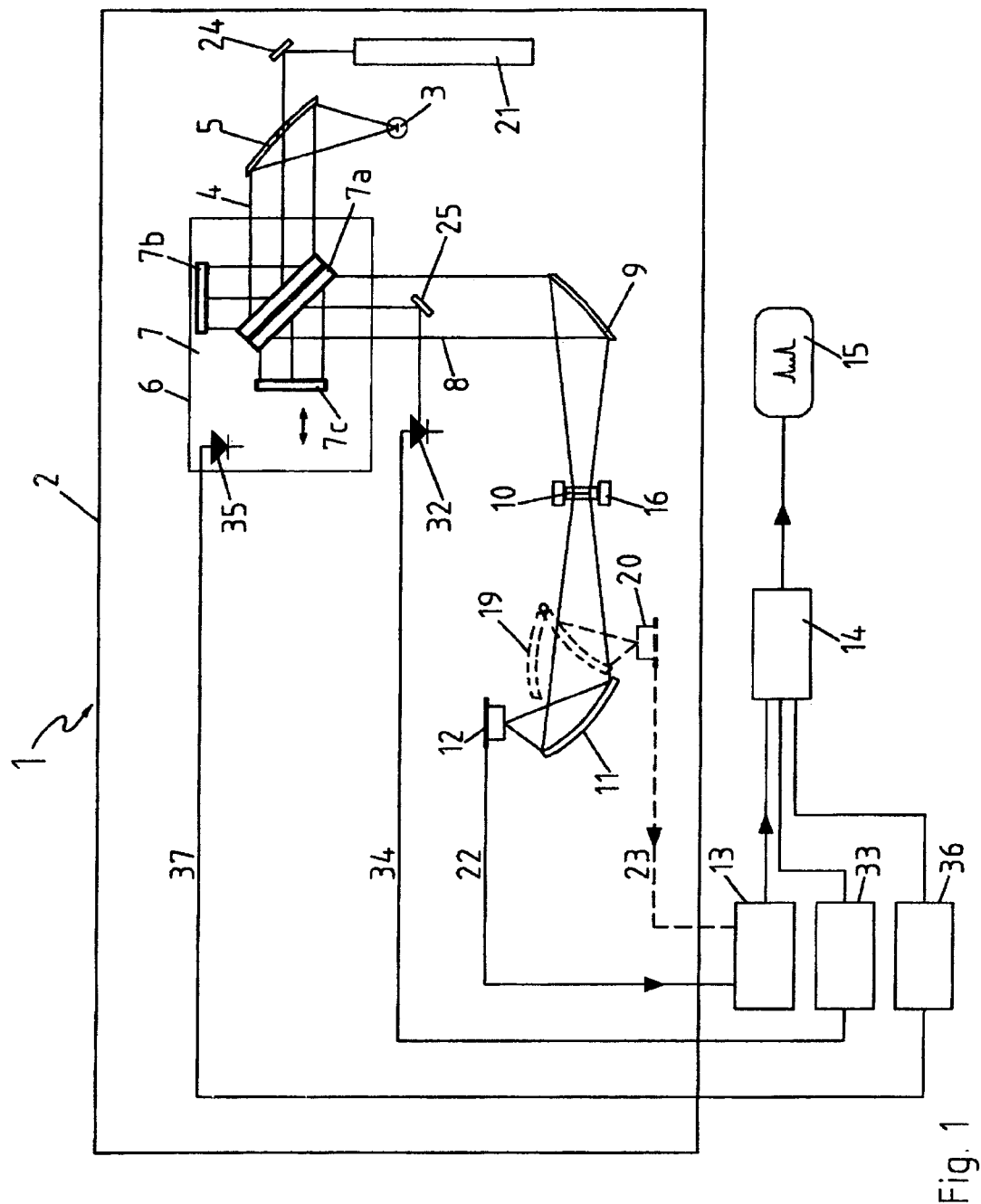
FIG. 1 shows a schematic view of a prior-art infrared spectrometer.

In detail, FIG. 1 shows a schematic view of an FTIR spectrometer 1 with a housing 2. A light source 3 is integrated into the housing 2. The source 3 emits an input light beam 4 via a concave mirror 5 to a Michelson interferometer 7 located in an interferometer compartment 6. The interferometer 7 consists of a beamsplitter 7a and two interferometer mirrors 7b, 7c or retroreflectors, one of which is movable. A collimated output light beam 8 leaves the interferometer 7 and the interferometer compartment 6. At a sample position on a sample holder 16 a transparent sample 10 is irradiated by the output light beam 8 by means of a focussing concave mirror 9. Another concave mirror 11 concentrates the light passing the sample 10 onto the detector 12. The analogue signal of the detector 12 is transmitted, via a data line 22, to a remote digitizing unit 13 and digitized. A computer 14 monitors or controls the mirror translation of the interferometer 7, the data acquisition performed by the detector 12 and the digitizing unit, and processes the digitized signal to an optical spectrum, displayed by a CRT 15. Alternatively, the light coming from the sample surface can also be directed to an additional detector 20. The analogue detector 20 signal is also transmitted, via a data line 23, to a remote digitizing unit 13 and digitized. The controlling HeNe laser beam 21 is directed, via a folding mirror, to the interferometer 7 through a small aperture of mirror 5. The output light beam is directed to the detector 32 via an additional small folding mirror 25. The possibly electrically amplified analogue detector signal is transmitted to the digitizing unit 33 via the analogue data line 34. A temperature sensor 35 to record the instrument temperature may be integrated. Its electrical analogue signal is transmitted to an additional digitizing unit 36 via data line 37.

Figure 2:
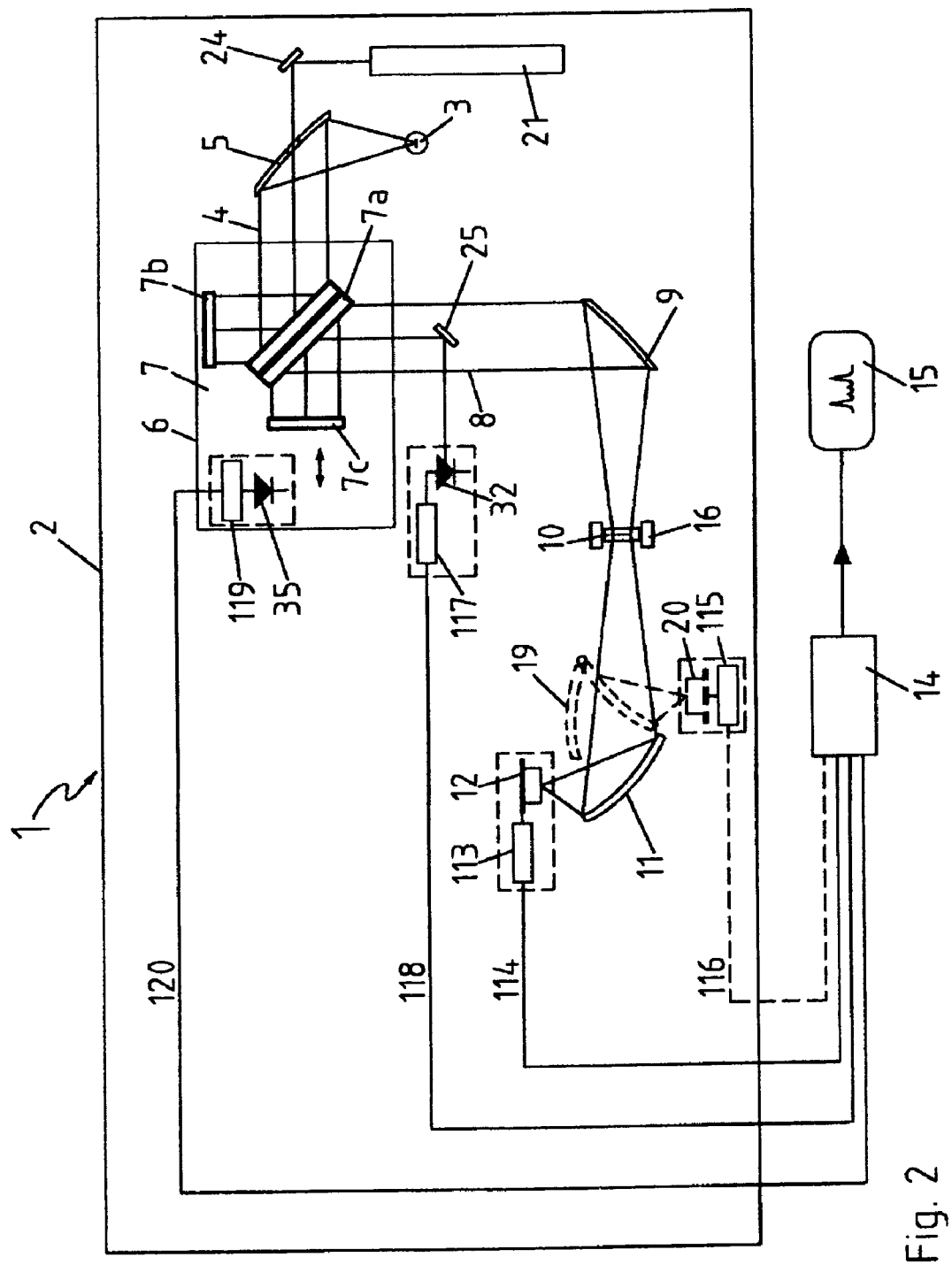
FIG. 2 shows a schematic view of a preferred embodiment of an infrared spectrometer in accordance with the present invention.

In accordance with the invention FIG. 2 shows a schematic view of an FTIR spectrometer 1 with a housing 2. A light source 3 is integrated into the housing 2. The source 3 emits an input light beam 4, via a concave mirror 5, to a Michelson interferometer 7 located in an interferometer compartment 6. The interferometer 7 consists of a beamsplitter 7a and two interferometer mirrors 7b, 7c or retroreflectors, one of which is movable. A collimated output light beam 8 leaves the interferometer 7 via the interferometer compartment 6. At a sample position on a sample holder 16 a transparent sample 10 is iilluminated by the output light beam 8 by means of a focussing concave mirror. Another concave mirror 11 concentrates the light passing the sample 10 onto 12. The analogue detector 12 signal is directed to a digitizing unit 113 spatially immediately adjacent to the detector 12 and digitized. The digitized signal is transmitted to a computer 14 via a data line 114. This computer monitors or controls the mirror feed of the interferometer 7, the data acquisition performed by the detector 12 and the digitizing unit 13, and processes the digitized signals to an optical spectrum, displayed by a CRT 15. Alternatively, the light coming from the sample surface can also be directed to an additional detector 20 via a folding mirror 19. The analogue detector 20 signal is also transmitted to a spatially immediately adjacent digitizing unit 115 and digitized. The digitized signal is transferred to the computer 14 via a data line 116.

The possibly electrically amplified signal of the laser detector 32 is transformed into a digitized electrical signal within the digitizing unit 117 which is spatially immediately adjacent to the detector 32, and transferred to the processing unit 14 via the digital data line 118. The temperature signal of the temperature sensor 35 is transformed into a digital signal within the digitizing unit which is immediately adjacent to the sensor, and transferred as digital signal to the computer unit 14 via the data line 120.

We claim:

1. An infrared spectrometer comprising:
a first housing;
an optical light source disposed in said first housing;
an optical interferometer disposed in said first housing to divide an input light beam emitted by said light source into two partial beams for generating a variable optical path difference between said two partial beams and for recombining both of said partial beams into one output light beam;
sample holding means disposed in the housing to accept a sample upon which said output light beam impinges;
a second housing disposed in said first housing, said second housing having a light beam input opening and a signal output;
a single-element detector for analyzing a detector light beam emanating from the sample, said single-element detector disposed in said second housing to accept said detector light beam after passage through said input opening;
a preamplifier disposed in said second housing, said preamplifier having an input communicating with said detector to accept signals emanating from said detector in response to said detector light beam; and
means for digitizing signals, said digitizing signal means disposed in said second housing and having an input communicating with an output of said preamplifier.

2. The infrared spectrometer of claim 1, wherein said single-element detector and an ADC are integrated on a chip.

3. The infrared spectrometer of claim 1, wherein said single-element detector and an ADC are both integrated on a circuit board.

4. The infrared spectrometer of claim 1, wherein said single-element detector and an ADC are integrated on two circuit boards which are immediately adjacent to each other.

5. The infrared spectrometer of claim 1, wherein said single-element detector and said digitizing means are assembled as a replaceable module.

6. The infrared spectrometer of claim 2, wherein said single-element detector and said digitizing means are assembled as a replaceable module.

7. The infrared spectrometer of claim 3, wherein said single-element detector and said digitizing means are assembled as a replaceable module.

8. The infrared spectrometer of claim 4, wherein said single-element detector and said digitizing means are assembled as a replaceable module.

9. The infrared spectrometer of claim 1, wherein at least one of digitized AC signals and digitized DC signals are transmitted.

10. The infrared spectrometer of claim 2, wherein at least one of digitized AC signals and digitized DC signals are transmitted.

11. The infrared spectrometer of claim 3, wherein at least one of digitized AC signals and digitized DC signals are transmitted.

12. The infrared spectrometer of claim 1, further comprising an imaging detector array which is interchangeable with said single-element detector.

13. The infrared spectrometer of claim 5, further comprising an imaging detector array which is interchangeable with said single-element detector.

14. The infrared spectrometer of claim 1, further comprising means for switching said detector light beam between at least two detectors.

15. The infrared spectrometer of claim 14, wherein said switching means comprises a hinged mirror.

16. The infrared spectrometer of claim 1, further comprising at least one additional detector, said at least one additional detector having an individual means to digitize respective additional detector signals, wherein each of said additional digitizing means is disposed immediately adjacent to its associated additional detector.

17. The infrared spectrometer of claim 2, further comprising at least one additional detector, said at least one additional detector having an individual means to digitize respective additional detector signals, wherein each of said additional digitizing means is disposed immediately adjacent to its associated additional detector.

18. The infrared spectrometer of claim 3, further comprising at least one additional detector, said at least one additional detector having an individual means to digitize respective additional detector signals, wherein each of said additional digitizing means is disposed immediately adjacent to its associated additional detector.

19. The infrared spectrometer of claim 4, further comprising at least one additional detector, said at least one additional detector having an individual means to digitize respective additional detector signals, wherein each of said additional digitizing means is disposed immediately adjacent to its associated additional detector.

* * * * *